United States Patent [19]

Remboski et al.

[11] Patent Number: 5,067,463
[45] Date of Patent: Nov. 26, 1991

[54] METHOD AND APPARATUS FOR OPERATING AN ENGINE

[75] Inventors: Donald J. Remboski; Steven L. Plee, both of Northborough; Jialin Yang, Westboro; Robert W. Law, Acton; Michael T. Vincent, Grafton, all of Mass.

[73] Assignee: Barrack Technology Limited, West Perth, Australia

[21] Appl. No.: 485,150

[22] Filed: Feb. 26, 1990

[51] Int. Cl.$^5$ .................. F02D 41/14; F02P 5/145; G01L 23/16

[52] U.S. Cl. .................. 123/425; 123/426; 123/435; 123/494; 73/35; 73/116

[58] Field of Search .............. 123/425, 435, 494, 426; 73/35, 116

[56] References Cited

U.S. PATENT DOCUMENTS

| | | | |
|---|---|---|---|
| 3,067,610 | 12/1962 | Bockemuehl et al. | 73/35 |
| 3,978,720 | 9/1976 | Ford | 73/116 |
| 4,358,952 | 11/1982 | Maurer et al. | 73/35 |
| 4,369,748 | 1/1983 | Steinke et al. | 123/425 |
| 4,381,748 | 5/1983 | Eckert et al. | 123/494 |
| 4,397,283 | 8/1983 | Komaroff et al. | 123/494 |
| 4,413,509 | 11/1983 | Moser et al. | 73/117.3 |
| 4,419,212 | 12/1983 | Dietz et al. | 204/424 |
| 4,425,788 | 1/1984 | Franke et al. | 73/35 |
| 4,437,334 | 3/1984 | Laurenz | 73/35 |
| 4,444,043 | 4/1984 | Hattori et al. | 73/35 |
| 4,444,169 | 4/1984 | Kirisawa et al. | 123/344 |
| 4,446,723 | 5/1984 | Boning et al. | 73/35 |
| 4,463,729 | 8/1984 | Bullis et al. | 123/478 |
| 4,487,184 | 12/1984 | Böning et al. | 123/425 |
| 4,492,108 | 1/1985 | Van Zanten | 73/35 |
| 4,887,574 | 12/1989 | Kuroiwa et al. | 123/425 |
| 4,919,099 | 4/1990 | Extance et al. | 123/435 |
| 4,930,478 | 6/1990 | Plee et al. | 123/435 |
| 4,940,033 | 7/1990 | Plee et al. | 123/425 |

FOREIGN PATENT DOCUMENTS

| | | | |
|---|---|---|---|
| 60-17239 | 1/1985 | Japan | 123/425 |
| WO89/11031 | 11/1989 | World Int. Prop. O. | 123/425 |

OTHER PUBLICATIONS

R. A. Pinnock, P. Extance and C. P. Cockshott; Combustion Sensing Using Optical Fibres; 12–15 Oct. 1988.
Donald J. Remboski, Jr., Steven L. Plee, and Jay K. Martin; An Optical Sensor for Spark–Ignition, Engine Combustion Analysis and Control; Feb. 27, 1989.
Lucas Automotive, Gasoline Engine Systems Division; Adaptive Ignition Control.
E. Day and B. J. Mehallick; Officially Measured Engine Timing.
M. Takata, T. Ogawa, F. Kobayashi and S. Ikeda; Development of Optical Combustion Timing Sensor for a Diesel Engine.
Vanzetti Systems, Inc.; Combustion Process Monitor for Automobile Engines and Instrumentation Proposal.

*Primary Examiner*—Andrew M. Dolinar
*Attorney, Agent, or Firm*—Harness, Dickey & Pierce

[57] ABSTRACT

An internal combustion engine is provided having a luminosity detector and an arrangement for measuring certain parameters and running conditions of the engine such as air/fuel ratio in response to sensed combustion conditions within the combustion chamber based on particular gain independent parameters of the luminosity signal and selected engine parameters such as speed. The gain independent luminosity parameters can also be used in an engine control loop to adjust the various parameters of the engine like air/fuel ratio so as to obtain the desired luminosity characteristics and to obtain better running of the engine.

27 Claims, 18 Drawing Sheets

Comparison of Pressure, Luminosity and Heat Release Rate

——— $P/P_{max}$ (Pressure)

- - - - - $\dfrac{dQ}{d\Theta} \Big/ \dfrac{dQ}{d\Theta}_{max}$ (Heat Release Rate)

— — — $L/L_{max}$ (Luminosity)

METHOD AND APPARATUS FOR OPERATING AN ENGINE

BACKGROUND OF THE INVENTION

This invention relates to a method and apparatus for operating ah engine, and more particularly to an improved method and apparatus for operating an engine in response to actual conditions sensed in the combustion chamber and for determining certain operating parameters and running conditions of the engine.

With modern technology and electronics, many of the components and running conditions of an internal combustion engine can be controlled more accurately than with previous mechanical systems. For example, the control of the air/fuel ratio, spark timing, fuel injection timing and pulse, and other adjustable factors of engine operation are greatly facilitated through the use of electronic components and electronic computers. However, in order to accurately sense the running of the engine and the various phenomena occurring within the combustion chamber, it is necessary to provide a sensor that is directly positioned within the combustion chamber or in proximity to it and which senses the actual combustion conditions in the engine.

It has been understood that knocking can be determined by an optical sensor that operates within the combustion chamber and which senses the luminosity of the gases in that chamber. A wide variety of knock detectors have been proposed that employ such sensors. However, the inventors have discovered that luminosity in the combustion chamber and in particular various gain independent parameters of the luminosity signal or curve can indicate a much wider range of operating parameters and running conditions of the engine than previously realized.

It is, therefore, a principal object of this invention to provide an improved apparatus and method for operating an engine wherein a luminosity detector and particular gain independent parameters of its luminosity signal or curve are used to determine certain combustion conditions occurring in the combustion chamber such as start and end of combustion and to determine certain engine operating parameters and engine running conditions.

It is a further object of this invention to provide an improved system and method for operating an engine wherein the engine's adjustable parameters such as air/fuel ratio, spark timing, fuel injection, etc., can be varied in response to the luminosity signal and in particular various gain independent parameters of that signal so as to provide better running of the engine.

It is a still further object of this invention to provide engine control systems wherein the engine can be controlled in response to the luminosity signal. The control system should be predicated on certain measured parameters of the engine. For example, it is very desirable to be able to obtain and measure such engine parameters and running characteristics as peak cylinder pressure in relation to output shaft or crank angle, air/fuel ratio, indicated mean effective pressure (IMEP) (which is in effect the same as measuring engine torque or power), $NO_x$ emissions and the gas temperature at exhaust valve opening.

A type of engine sensor has been proposed that senses the actual luminosity of the gases within the combustion chamber. A wide variety of U.S. Pat. Nos. illustrating and describing the use of such sensors have issued including the following:

4,358,952
4,369,748
4,377,086
4,393,687
4,409,815
4,412,446
4,413,509
4,419,212
4,422,321
4,422,323
4,425,788
4,468,949
4,444,043
4,515,132

For the most part, these patents disclose arrangements wherein the sensor is utilized to sense only total luminosity and to equate the luminosity signal to a knocking signal. However, as previously noted, the inventors have discovered that this luminosity signal or curve and in particular various gain independent parameters of the luminosity signal can also be employed to determine particular phenomena occurring in the combustion chamber and to provide an indication of various engine parameters and running characteristics.

SUMMARY OF THE INVENTION

This invention is adapted to be embodied in a method for operating an internal combustion engine and an apparatus therefor that has a combustion chamber and means for forming a combustible air/fuel mixture within the combustion chamber. In accordance with this embodiment of the invention, the luminosity of the gases in the combustion chamber are sensed or detected, a curve is generated based on the detected luminosity, the characteristic of at least one gain independent parameter of the luminosity curve is determined such as location of peak luminosity, preferably in relation to output shaft or crank angle, and at least one engine parameter such as indicated mean effective pressure or air/fuel ratio is measured based on the determined characteristic of at least one gain independent parameter.

Another feature of the invention is adapted to be embodied in a method for operating an internal combustion engine and an apparatus therefor having a combustion chamber and means for causing combustion to occur in the combustion chamber. In accordance with this feature of the invention, the luminosity of the gases in the combustion chamber are detected, a curve is generated based on the detected luminosity, the characteristic of at least one gain independent parameter of the luminosity curve is determined, preferably in relation to output shaft or crank angle, and an engine parameter is measured and adjusted to attain a desired relationship between the characteristic of the particular gain independent parameter and output shaft angle

DETAILED DESCRIPTION OF THE PREFERRED EMBODIMENTS

Figure 1:
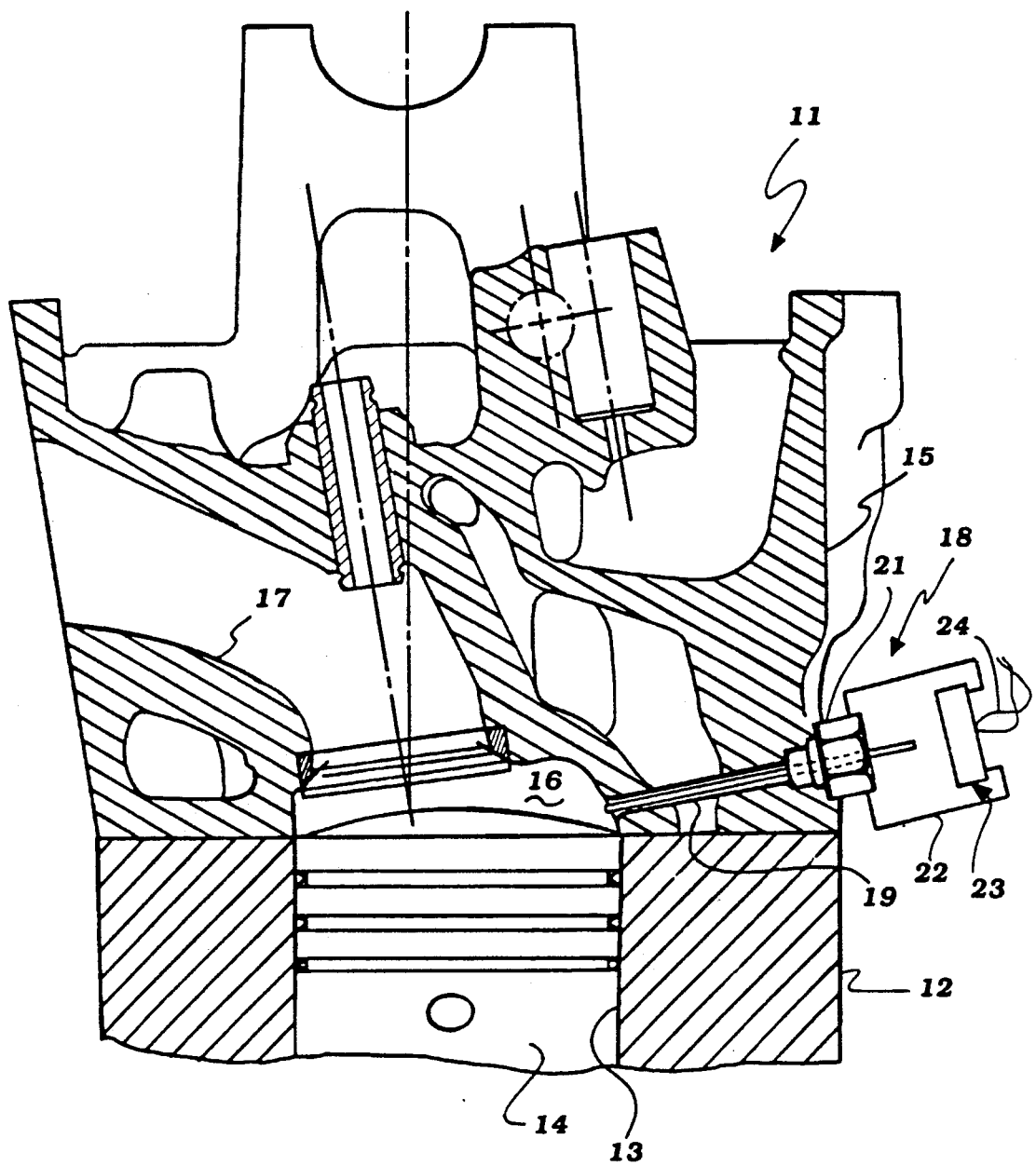
FIG. 1 illustrates a cross-sectional view taken through a single combustion chamber of a multi-cylinder internal combustion engine constructed and operated in accordance with embodiments of the invention.

Referring to FIG. 1 of the drawings, a multi-cylinder internal combustion engine is identified generally by the reference numeral 11. It is to be understood that, although the invention has particular utility in multi-cylinder engines, certain facets of the invention may find application in single cylinder engines as well. Also, although the invention is described in conjunction with a reciprocating type engine, the principles of the engine may be utilized with engines of the non reciprocating type, such as rotary engines, and with engines operating on either two stroke or four stroke cycles.

Inasmuch as the invention is concerned primarily with the combustion chamber and the conditions therein, only a cross sectional view taken through one of the combustion chambers is believed to be necessary to understand the invention. This cross sectional view shows a cylinder block 12 having a cylinder bore 13 in which a piston 14 is supported for reciprocation. The piston 14 is connected by means of a connecting rod (not shown) to a crankshaft for providing output power from the engine.

A cylinder head 15 is affixed in a known manner to the cylinder block 12 and has a recess 16 which cooperates with the cylinder bore 13 and head of the piston 14 to provide a chamber of variable volume, sometimes referred to hereinafter as the combustion chamber.

An intake port 17 and an exhaust port (not shown) extend through the cylinder head 15 and have their communication with combustion chamber 16 controlled by poppet type intake and exhaust valves (not shown) for admitting a charge to the combustion chamber 16 and for discharging the burnt charge from the combustion chamber 16. It is to be understood, of course, that the combustion chamber 16 may have a plurality of intake and exhaust valves or may employ ports in lieu of valves and that the engine 11 may include a plurality of combustion chambers 16.

The charge admitted to the combustion chamber 16 may comprise pure air or an air/fuel mixture that is formed by a suitable charge former such as a port or throttle body type fuel injector or carburetor. Alternatively, if pure air is delivered or injected, direct cylinder or manifold injection may be employed for delivering or injecting fuel into the combustion chamber 16 to form the air/fuel mixture. The air/fuel ratio may be controlled in a wide variety of known manners such as by means of throttle valves, fuel control valves, injector pulse width, injection duration, injection timing, injection pulse, etc. Although an important feature of the invention is the parameters under which the air/fuel ratio are controlled, the actual physical hardware for adjusting the air/fuel ratio is not part of the invention. However, in accordance with the invention, these engine parameters may be adjusted manually or automatically as part of an engine control loop so as to obtain the desired air/fuel ratio which can be a function of engine speed and/or engine load.

The engine 11 is preferably of the spark ignited type. However, the types of controls exercised and the nature of luminosity detecting or sensing may vary with different engines. In an engine 11 of the spark ignited type, a spark plug will be carried in the cylinder head 15 and have its gap exposed in the combustion chamber 16. The spark timing is controlled by a suitable mechanism which may be of any conventional type; however, the timing of the spark firing can be varied in accordance with parameters as hereinafter described.

As has been previously noted, the invention is capable of embodiment in any of a wide variety of conventional types of internal combustion engines and, for that reason, the details of the engine construction are not necessary to understand how the invention can be practiced by those skilled in the art.

However, in accordance with the invention, there is provided in the combustion chamber 16, a luminosity detector, indicated generally by the reference numeral 18. The luminosity detector 18 includes a fiber optic probe 19 or other type of optical access which extends through the cylinder head 15 and has its end terminating at the combustion chamber 16. The detector 18 and fiber optic probe 19 is preferably of the type described in the application entitled "Luminosity Detector", Ser. No. 284,193, filed Dec. 14, 1988 and in the continuation-in-part application of the same title, Ser. No. 467,883, filed Jan. 22, 1990, both in the names of Donald J. Remboski et al and assigned to the Assignee of this application. The disclosures of these applications are incorporated herein by reference. The probe 19 can be formed from a relatively inexpensive material such as synthetic sapphire ($Al_2O_3$) or other materials having similar characteristics. A probe having a diameter of 0.06" has been found to be practical and makes it relatively easy to install in the cylinder head.

The fiber optic probe 19 is held in place by means of a compression fitting 21 and has its outer end disposed within a light sealed housing 22 in proximity to a silicon photo detector 23.

Various luminosity spectra may be detected by the probe 19 or merely a total luminosity signal may be read. It has been found that certain constituents of the glowing gases in the combustion chamber 16 glow at different spectral range and this may be utilized to sense the amount and condition of such components in the combustion chamber 16 during each cycle of operation.

Depending on the particular gas or gases to be detected or sensed, it may be desirable to provide a monochromator or an optical filter in front of the silicon photo detector 23 so as to select a desired wavelength of light which is being measured. For this application the probe 19 is employed to measure the overall radiant emission from products of combustion (primarily $H_2O$) in the near infrared region between 850 nm and 1000 nm. For these correlations a wavelength band centered at 927.7 nanometers $+/-20$ nm was used. The near infrared region is monitored because it is not strongly influenced by radiant emission from the walls of the combustion chamber 16, nor is it sensitive to emission from the flame surface. In addition, this particular wavelength band coincides with the peak spectral response of the silicon photo detector 23.

Figure 9:
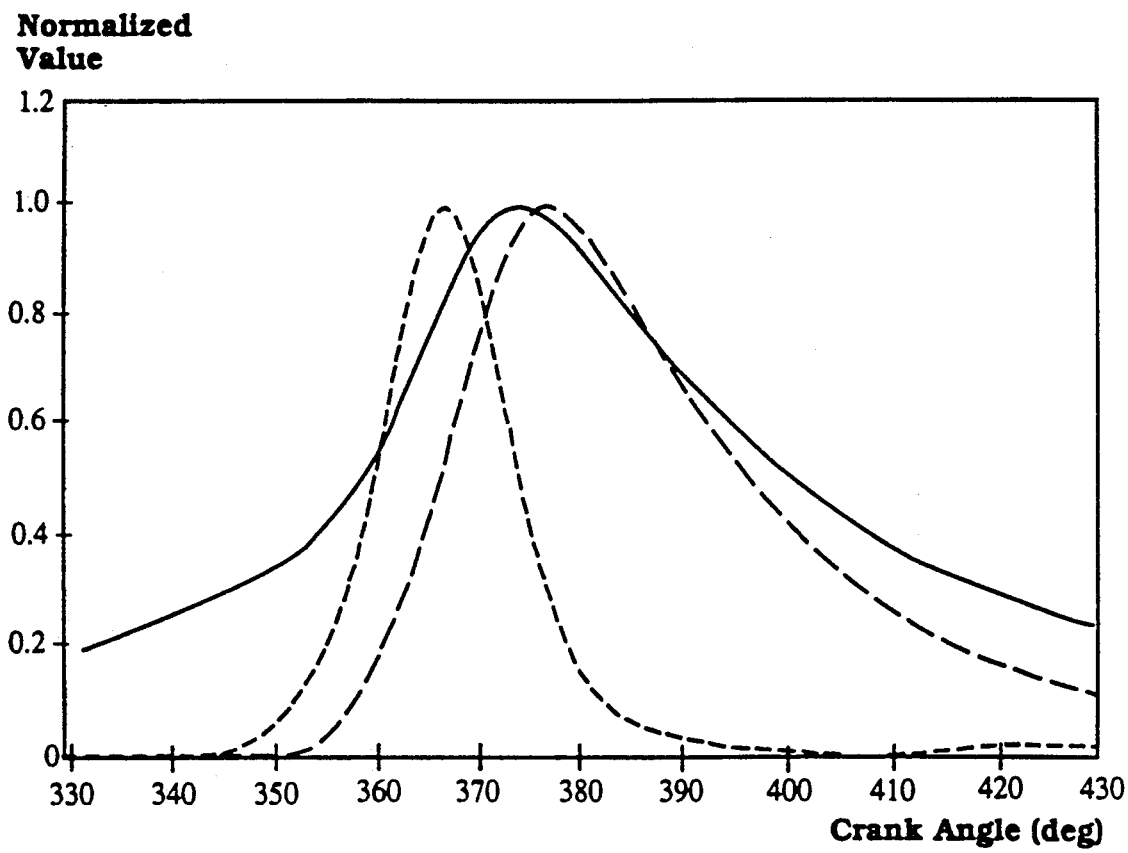
FIG. 9 shows a comparison of pressure, luminosity and heat release rate.

The detector 23 is connected to a remotely positioned computer control unit by means of conductors 24. In addition to converting the voltage signal from the silicon photo detector 23 to an output indicative of luminosity, the remotely positioned control unit which may measure certain engine parameters as well, may also receive input signals from other sensors normally employed on the engine, for example, air/fuel ratio, intake manifold pressure and temperature, engine speed, and spark timing angle sensors. These types of sensors are normally employed with modern internal engines and their signals can be processed in conjunction with the luminosity signal to provide certain measured characteristics of the engine operation. The remotely positioned control unit may be of any suitable type and is particularly adapted to transmit the signal from the detector 23 into an output indicative of luminosity within the combustion chamber 16. A typical luminosity signal or curve as a function of crank angle is shown in FIG. 9. The measurement of the luminosity signal or curve and the location of its various gain independent parameters in relation to crank angle assumes a reciprocating type engine. However, in non-reciprocating engines these measurements can be done in relation to output shaft angle. Accordingly, output shaft angle is used in the claims and is intended to refer to crank angle as well.

It has been discovered that a wide variety of combustion conditions and other engine operating and running characteristics can be determined by the luminosity probe 18 and the luminosity curve generated as a result of the detected luminosity in the combustion chamber employed to adjust the parameters and running conditions of the engine to obtain optimum performance. These gain independent luminosity parameters have been found to provide very good indications of certain combustion conditions and engine operating and running conditions.

Gain independent luminosity parameters, as the name implies, are not affected by variations in the gain of the system as are gain dependent parameters. An example of a parameter which is gain dependent is peak luminosity ($L_{max}$). The advantage associated with using gain independent parameters to determine various combustion and engine conditions is that the luminosity measurements are not affected when the gain of the system decreases over time due to probe deposits, etc. The inventors have discovered that the use of gain independent luminosity parameters to correlate various combustion characteristics and engine conditions avoids the problem of a diminishing luminosity curve over time, since gain independent correlations are not affected by variations in the gain of the system. An example of a parameter that is gain independent is the location of peak luminosity ($caL_{max}$). As long as the luminosity signal maintains a sufficient signal to noise ratio, the location of peak luminosity in crank angle degrees will remain the same regardless of gain changes. In other words the inventors are using the shape of the luminosity curve rather than the amplitude to correlate their data.

Data for the gain independent correlations set forth below were obtained using a single cylinder of a 2.2 liter, 4 cylinder port fuel injected, spark ignited, automotive engine of the side flow type having a compression ratio of 8.9, a bore of 87.7 mm, a stroke of 92.0 mm and two valves per cylinder. The data was also obtained under various engine speeds (750, 1500 and 2400 rpm), intake manifold pressures (70 kPa, 85 kPa, wide open throttle), air/fuel ratios (13.0, 14.6, 16.5, 18.0), percent EGR (0, 5, 10, 15) and spark timing (minimum advance for best torque (MBT) $-10°$, MBT, MBT$+10°$).

Various empirical correlations have been developed by the inventors which relate the characteristics of various parameters of the luminosity curve to such engine operating parameters and running conditions as location of peak pressure ($caP_{max}$), indicated mean effective pressure (IMEP), air/fuel ratio, $NO_x$ emissions and burned gas temperature at exhaust valve opening ($T_{evo}$). Empirical correlations have been developed between luminosity parameters and start and end of combustion as well. These empirical correlations were established using a curve fitting routine which performs a multiple regression analysis using a quadratic response surface model for the function: $Y = A + B_1X_1 + B_2X_2 + \ldots + B_nX_n + C_{1,2}(X_1X_2) + C_{1,3}(X_1X_3) + \ldots + D_1X_1^2 + D_2X_2^2 + \ldots + D_nX_n^2$. The routine calculates regression coefficients for linear, cross product and squared terms. The correlations involve a combination of gain independent luminosity parameters plus selected engine parameters such as engine speed in revolutions per minute (speed), spark timing in crank angle degrees (spk), intake manifold pressure in kPa ($P_{int}$) intake manifold temperature in degrees celsius ($T_{int}$), coolant temperature in degrees celsius ($TH_2O$). $X_1$ through $X_n$ represent the various luminosity and engine parameters. The various A, B, C and D terms are curve fitting parameters generated in response to the luminosity and engine data set to generate a curve fit. Each data point in the following correlations represents a 100 cycle ensemble average. All correlations set forth below used to predict the various engine operating parameters and running conditions take the form of the above quadratic model. The inventors then tested their predicted values for the various engine operating parameters and running conditions by comparing those values with observed values. These comparisons using a full set of linear, cross product and squared terms in the quadratic model are shown in FIGS. 2-8. Comparisons using a reduced set of terms are shown in FIGS. 11-17.

Figure 2:
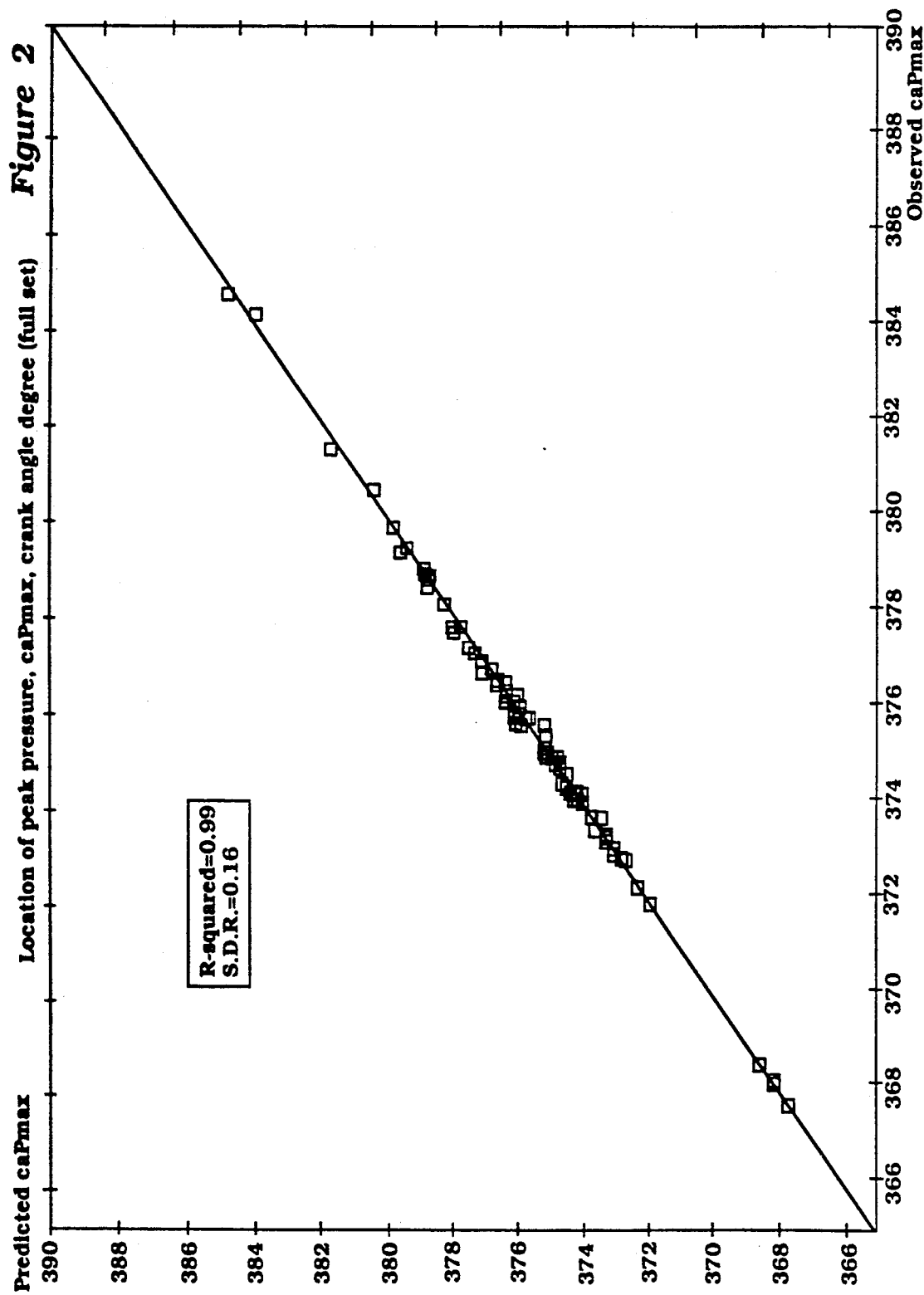
FIGS. 2 and 11 show the correlation between observed and predicted location of peak pressure in the combustion chamber ($caP_{max}$) in crank angle degrees using gain independent luminosity parameters and engine parameters.

The inventors have found that the luminosity curve can be used to give an indication of the location of peak pressure ($caP_{max}$) in crank angle degrees. The predicted value of $caP_{max}$ has been found to be a function of speed, $P_{int}$, $caL_{max}$, $cadL_{max}$, $1/(cadL_{min} - spk)$ where $caL_{max}$ is the location in crank angle degrees of peak luminosity, $cadL_{max}$ is the location in crank angle degrees of peak luminosity derivative, $cadL_{min}$ - spk is the phase difference between the location of minimum luminosity derivative and spark timing in crank angle degrees. The relationship obtained from the data between the observed location of pea pressure determined by a pressure transducer and the predicted value based on these luminosity and engine parameters using the correlation routine are shown in FIG. 2. The correlation coefficient between the predicted and observed location of peak pressure is 0.99 with a standard deviation of 0.16 degrees.

Figure 3:
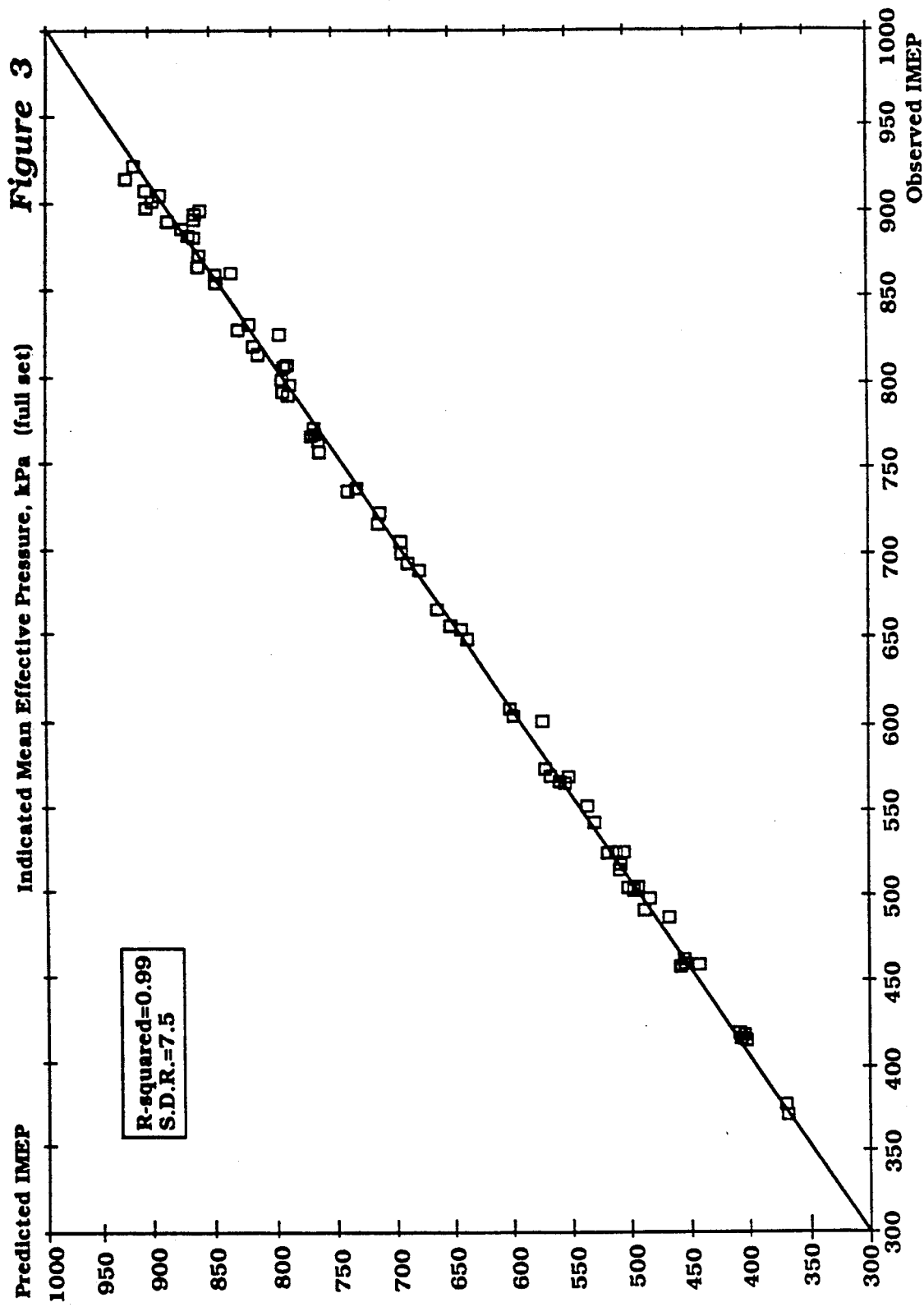
FIGS. 3 and 12 show the correlation between observed and predicted indicated mean effective pressure (IMEP) in kPa using gain independent luminosity parameters and engine parameters.

Indicated Mean Effective Pressure (IMEP) can also be predicted using engine and luminosity parameters. The predicted IMEP has been found to be a function of speed, $P_{int}$, $caL_{max}$, $cadL_{max}$, $cadL_{min}$, $1/(cadL_{min} - Spk)$ where $cadL_{min}$ is the location of minimum luminosity derivative in crank angle degrees. The relationship between the observed IMEP determined by a pressure transducer and the predicted IMEP based on these luminosity and engine measurements and determinations is shown in FIG. 3. The correlation between the predicted and observed IMEP is 0.99 with a standard deviation of 7.5 kPa.

This IMEP measurement based on the luminosity parameters can be used in managing engine torque as well as in cylinder balancing and traction control schemes. For example, the luminosity signal could be used to manage engine torque output during shifting of an automatic transmission.

Figure 4:
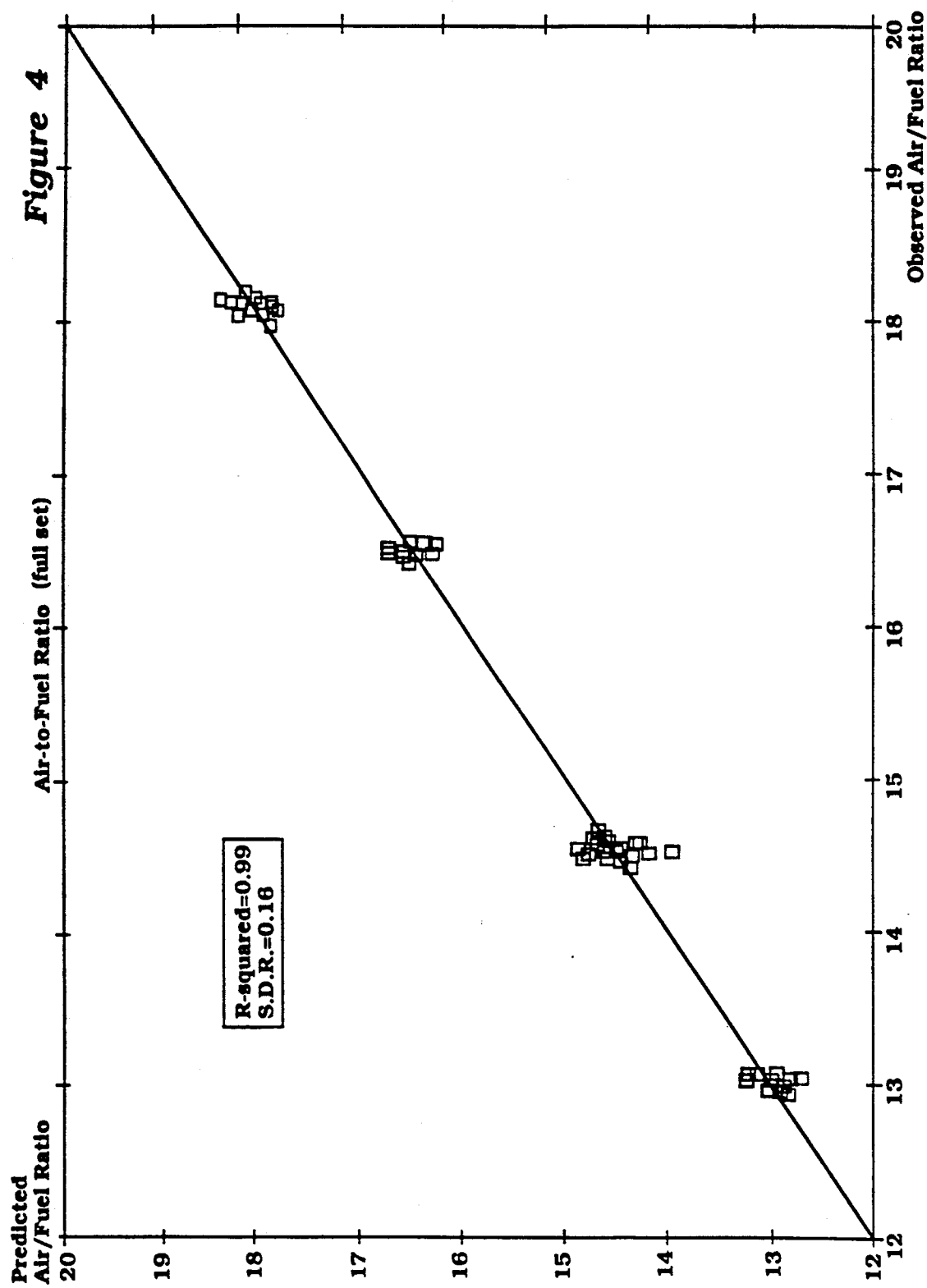
FIGS. 4 and 13 illustrate the correlation between observed and predicted air/fuel ratio using gain independent luminosity parameters and engine parameters.

The luminosity parameters can also be used to give a good indication of the air/fuel ratio. The predicted air/fuel ratio is a function of speed, $X_{cp}$, $Y_{cp}N$, $P_{int}$, $caL_{max}$, $cadL_{max}$, $cadL_{min}$, $1/(cadL_{min} - spk)$. $X_{cp}$ is the x-coordinate of the centroid of the luminosity signal in crank angle degrees and $Y_{cp}N$ is the normalized y-coordinate of the centroid of the luminosity signal against $L_{max}$. The correlation between predicted air/fuel ratio using the regression analysis for these parameters and observed air/fuel ratio determined by exhaust emission measurement is 0.99 with a standard deviation of 0.16 as shown in FIG. 4. The standard deviation of the correlation improves to 0.13 when EGR variations are omitted from the correlation.

Figure 10:
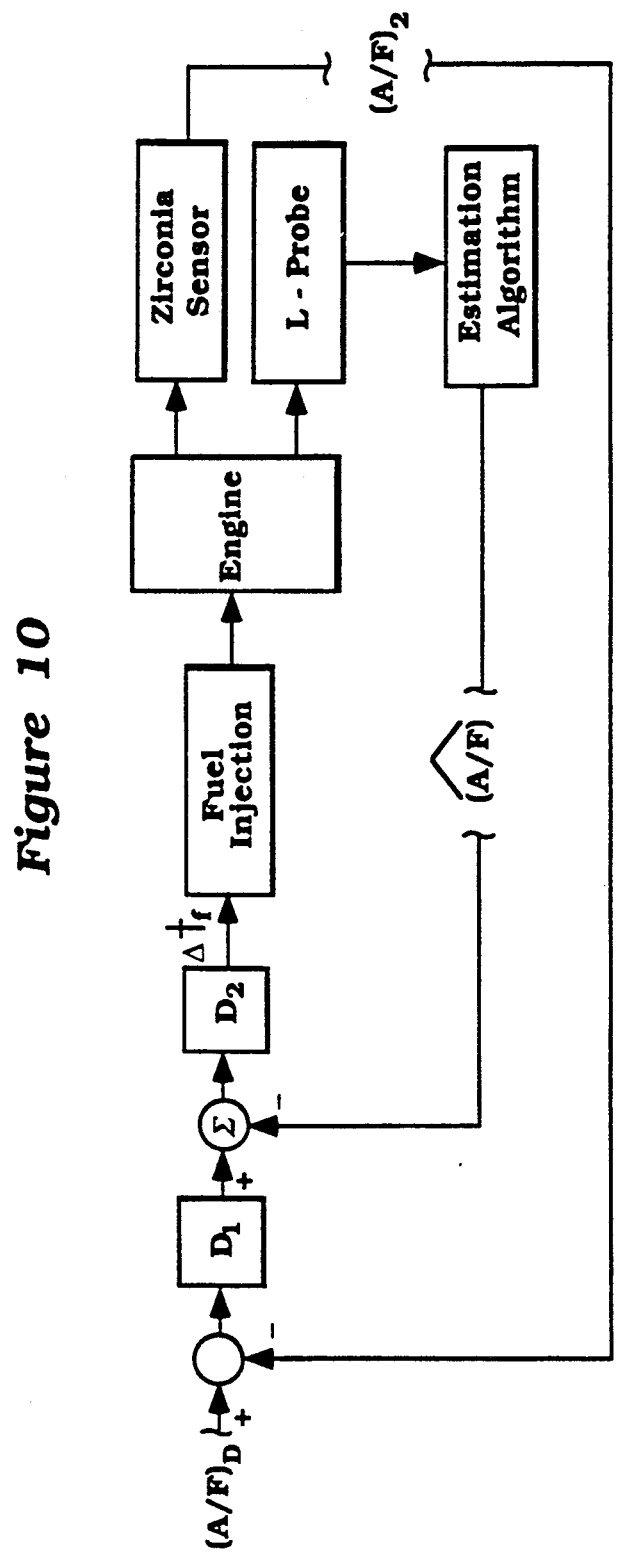
FIG. 10 shows a diagram of an air/fuel ratio control loop using the luminosity signal and a zirconia sensor.
Figure 11:
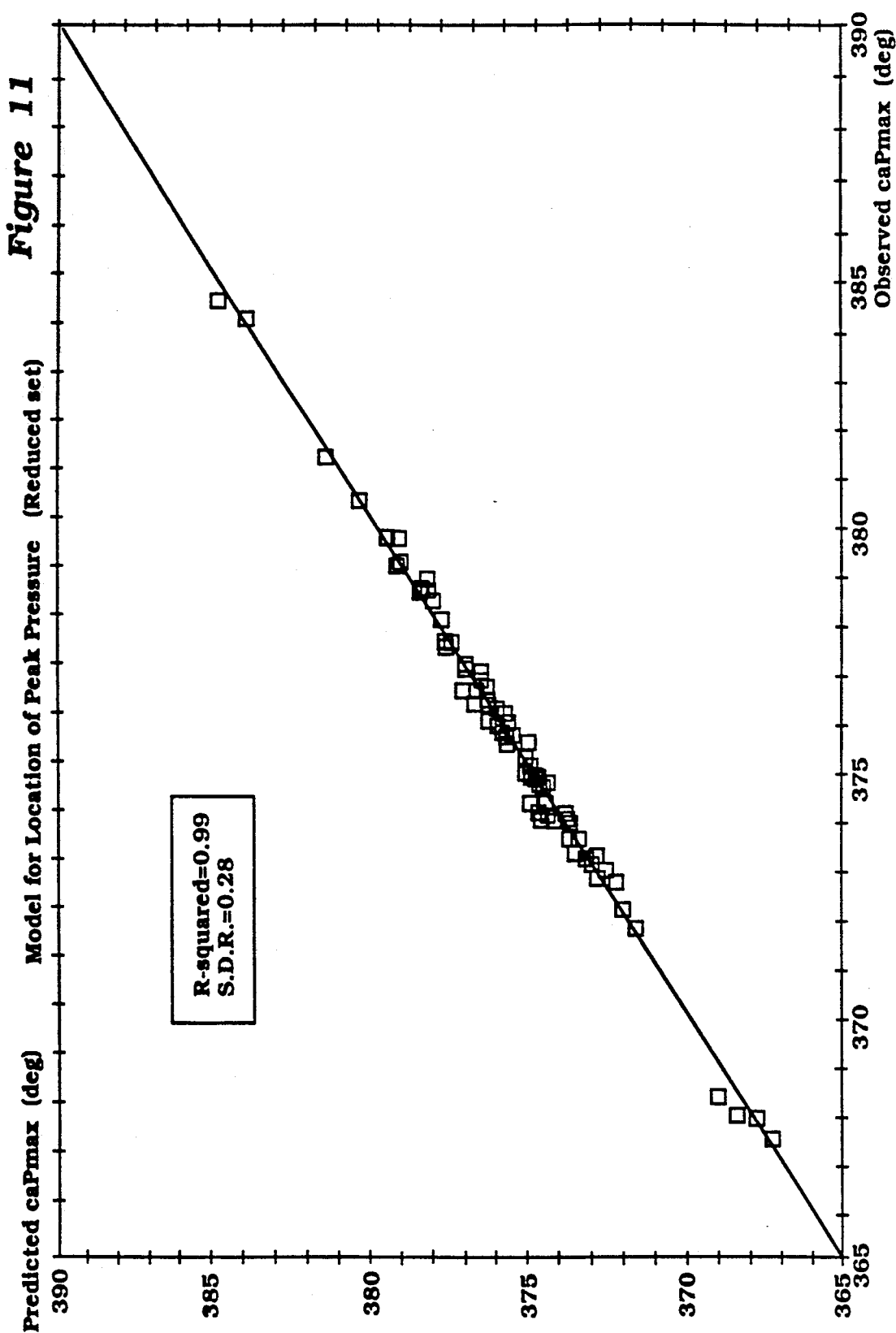
Figure 12:
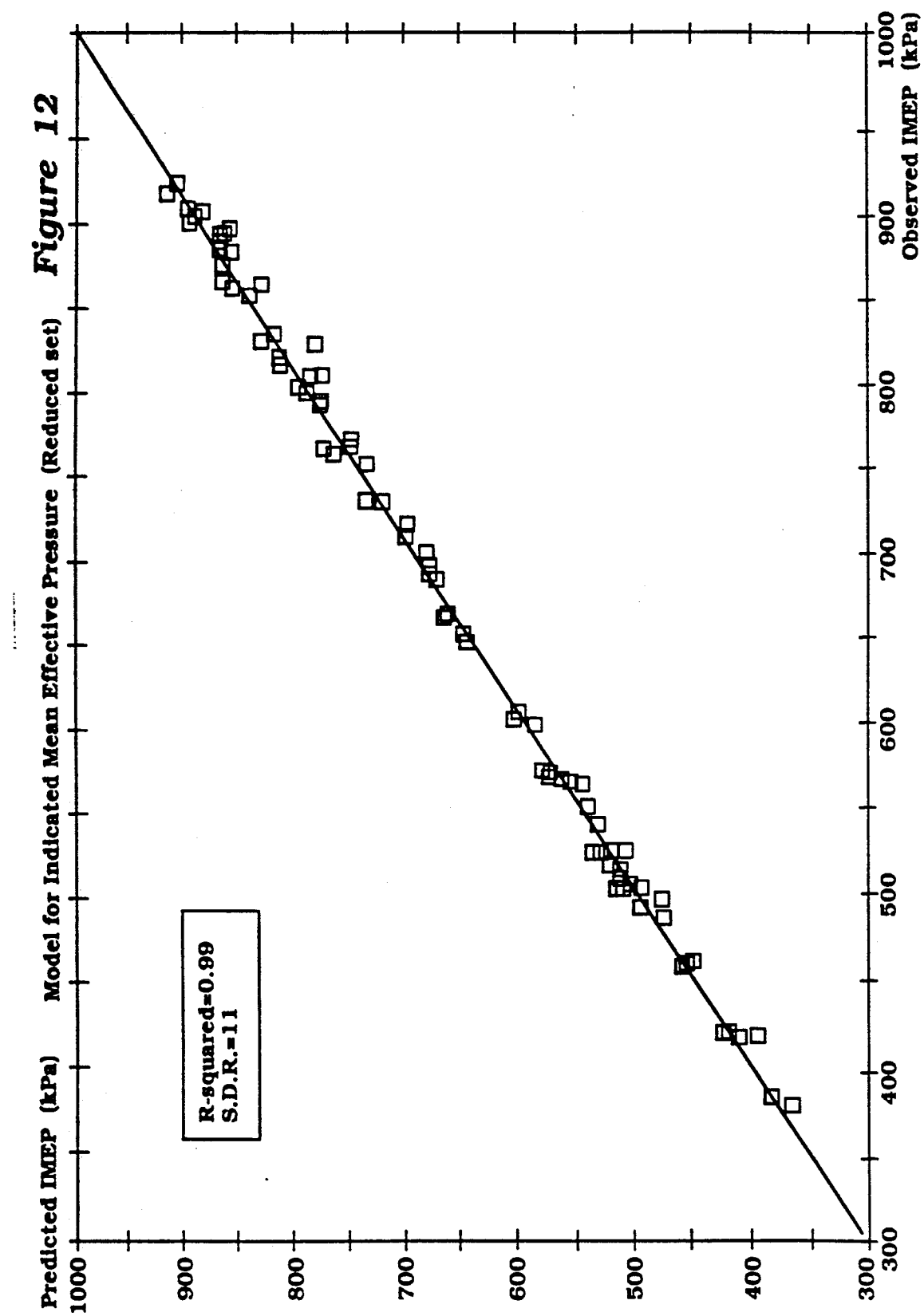
Figure 13:
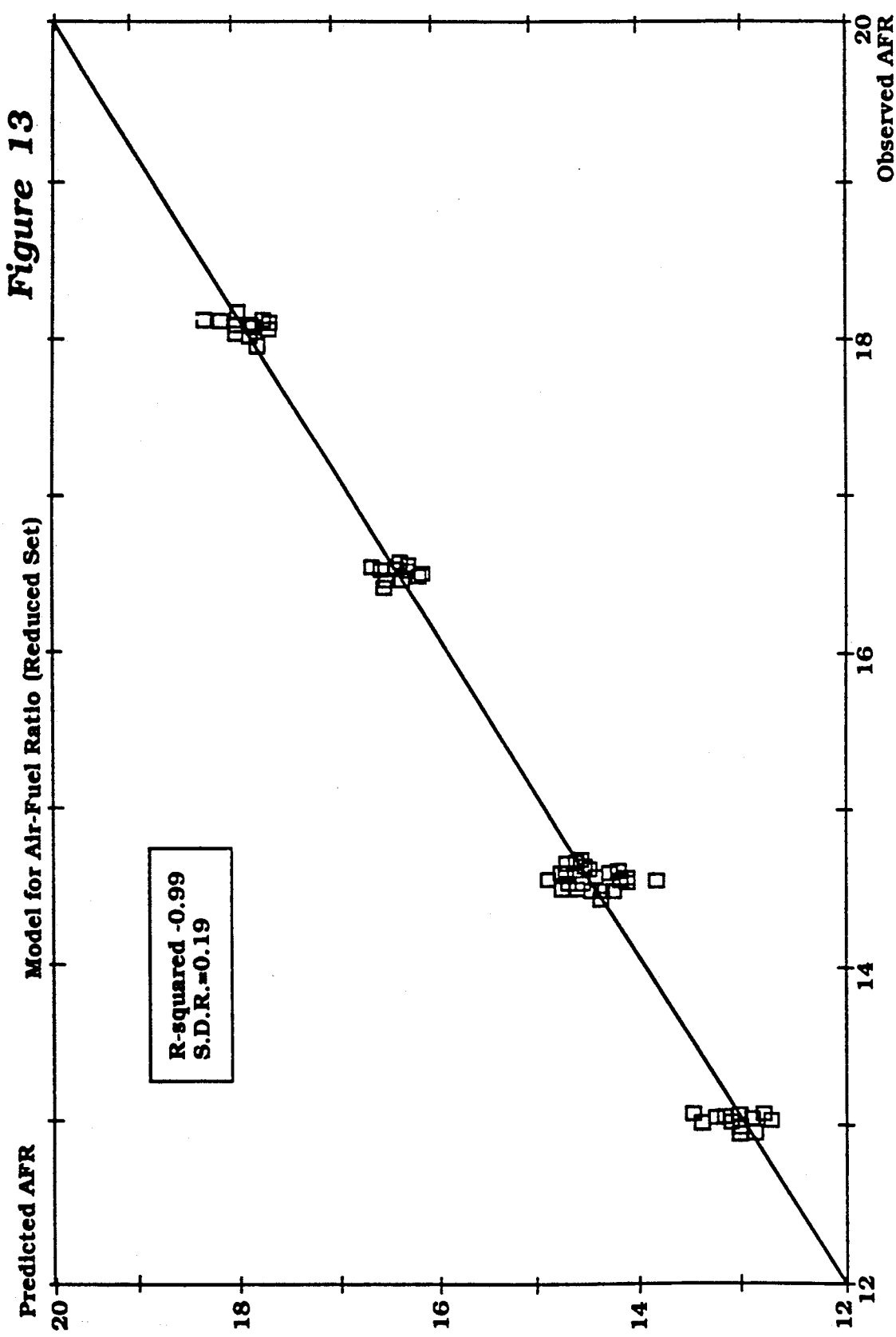
Figure 14:
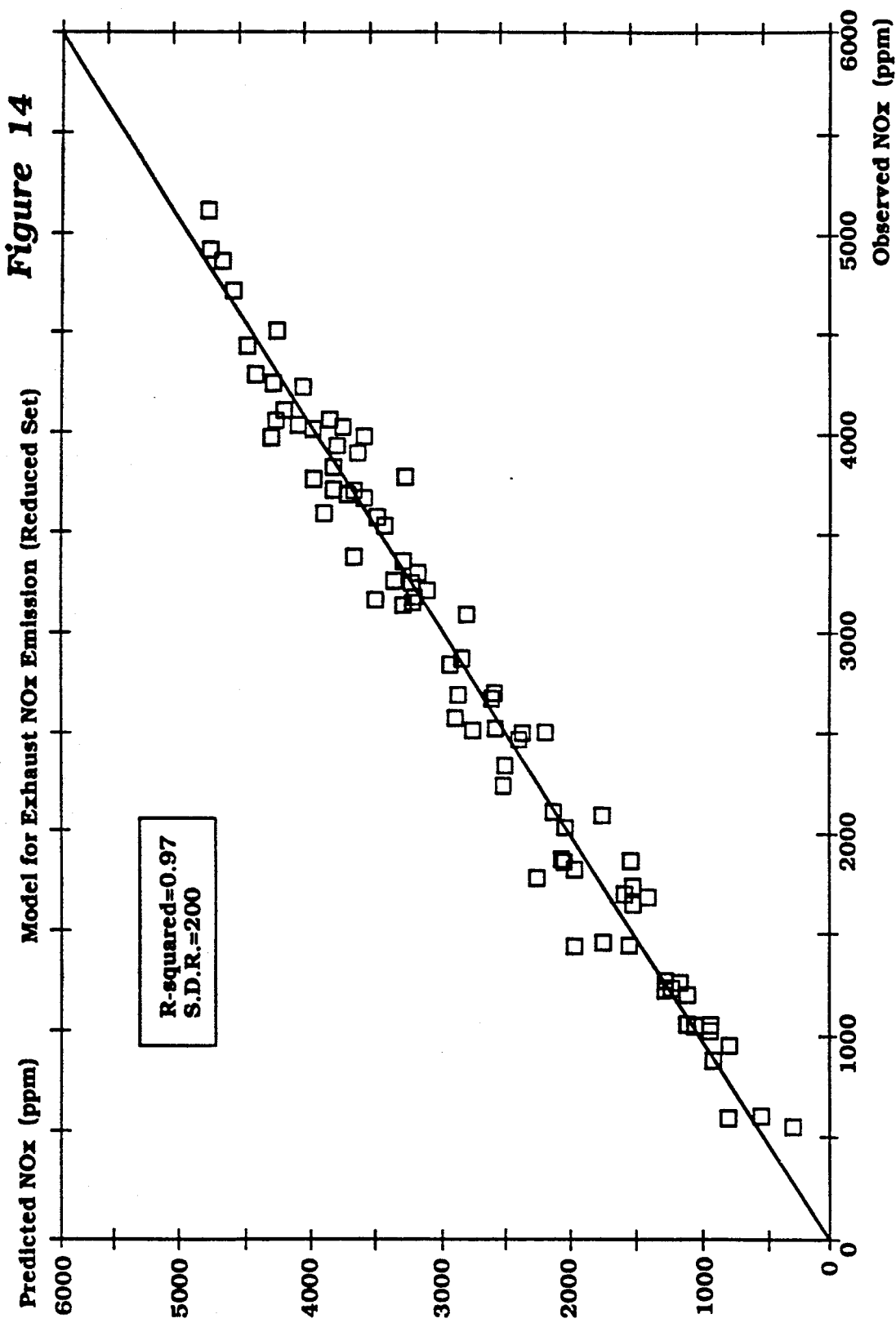
Figure 15:
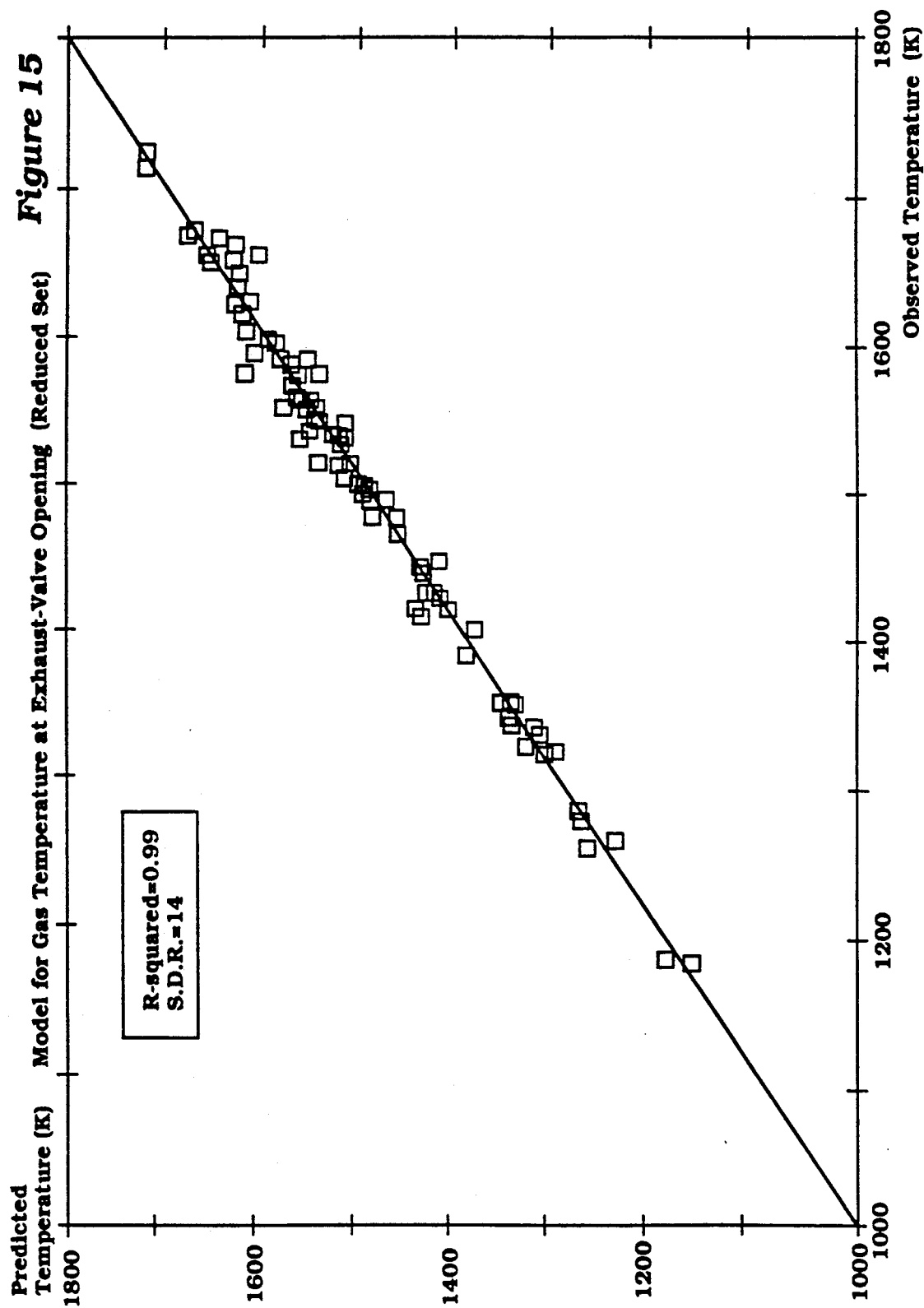
Figure 16:
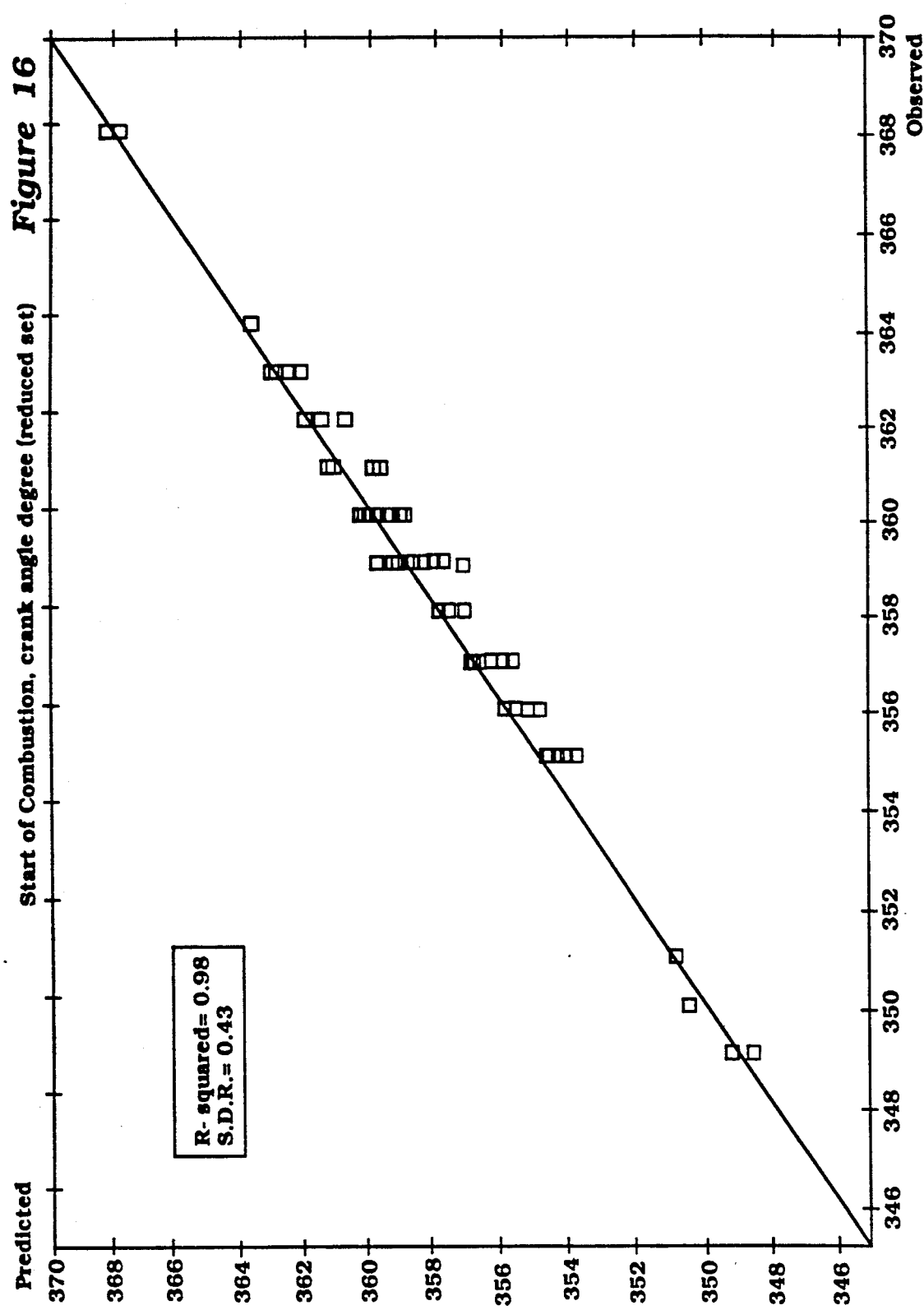
Figure 17:
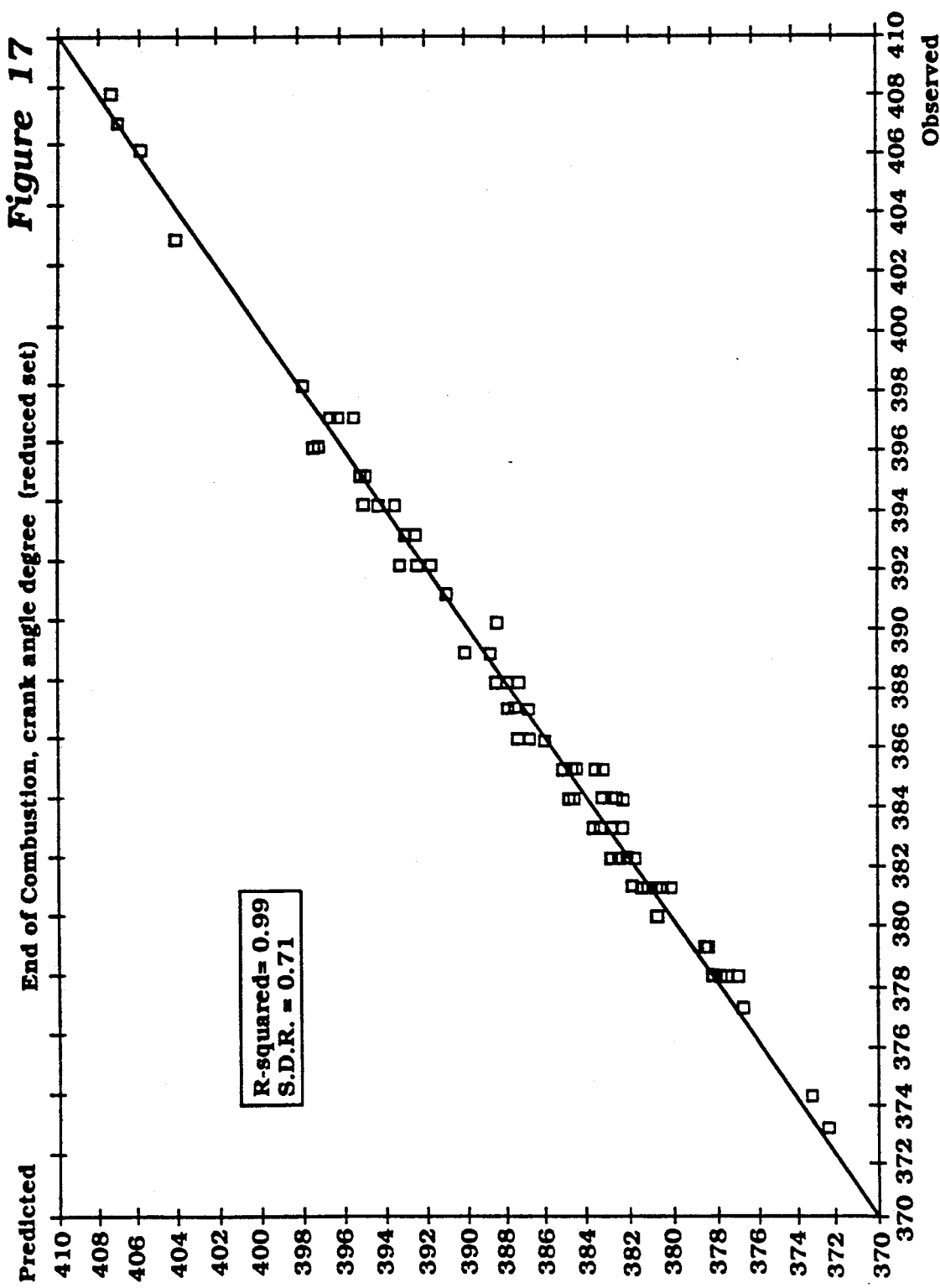
Figure 18:
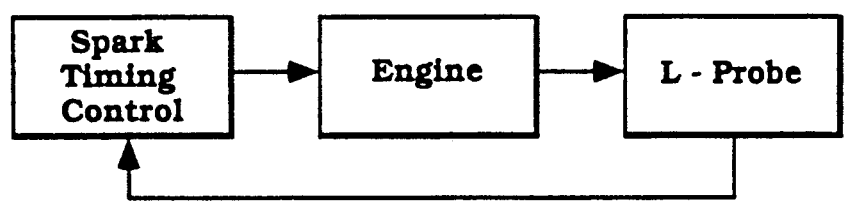
FIG. 18 shows a diagram of a spark timing control loop using the luminosity signal.

This luminosity measurement may also be able to provide an estimate of the air/fuel ratio of each cylinder of an engine on a cycle to cycle basis. This air/fuel ratio estimate could then be used in an engine control loop, as shown in FIG. 10, to provide tighter control through transient and cold starts. In FIG. 10 $(A/F)_D$ = desired value of air/fuel ratio, which may be a function of engine speed and/or load; A/F = air/fuel ratio determined from L-Probe; $(A/F)_2$ = air/fuel ratio determined from zirconia sensor; $D_1$ = zirconia control loop gain and dynamics, including an integrator; $D_2$ = L-Probe loop gain and dynamics; and $\Delta t_f$ = injector pulse width. The luminosity measurements could be incorporated in a control scheme along with a zirconia or oxygen sensor. The purpose of such a luminosity control loop is to provide an instantaneous response to a fuel injector control device when changes in the air/fuel ratio are observed. Longer term (ten cycles or more) control could be accomplished by the zirconia sensor which could be used to correct the luminosity loop. Logic could also be incorporated so that the primary signal for control of the air/fuel ratio during cold starts is from the luminosity measurement, thus yielding better control during this period than is now possible with the zirconia sensor inoperative.

The luminosity loop could be used to attenuate transient errors and thus reduce exhaust emissions. Individual cylinder resolution could also be used to provide a more uniformed control of air/fuel ratio to reduce overall emissions. A closed loop fuel control system during cold start and warm-up may also act to reduce emissions during this period.

Various gain independent luminosity parameters in connection with engine parameters can also be used to predict $NO_x$ exhaust emission. Predicted $NO_x$ exhaust emission has been shown to be a function of speed, $P_{int}$, $caL_{max}$ - spk, $1/(cadL_{min} - spk)$, $X_{cp}$, $Y_{cp}N$, $I_1/L_{max}$, $M_2/L_{max}$, $M_3/L_{max}$, where $caL_{max}$ - spk is the phase difference between location of peak luminosity and spark timing in crank angle degrees, $X_{cp}$ is the x-coordinate of the centroid of the luminosity signal in crank angle degrees, $Y_{cp}N$ is the normalized Y-coordinate of the centroid of the luminosity signal against $L_{max}$, $I_1/L_{max}$ is the normalized first moment of the luminosity signal against $L_{max}$, $M_2/L_{max}$ is the normalized second moment about $X_{cp}$ of the luminosity signal against $L_{max}$ and $M_3/L_{max}$ is the normalized third moment about $X_{cp}$ of the luminosity signal against $L_{max}$.

Figure 5:
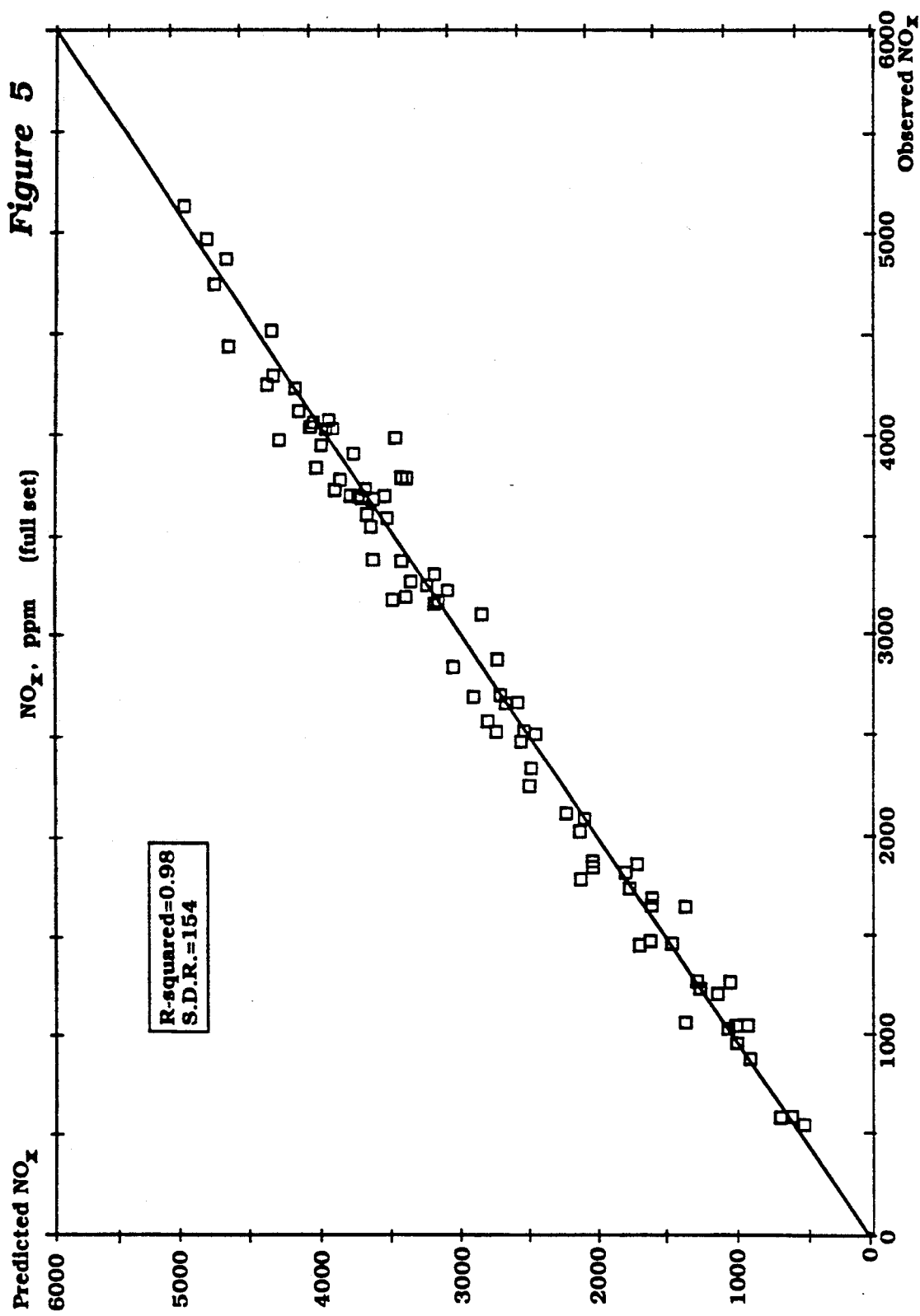
FIGS. 5 and 14 depict the correlation between observed and predicted $NO_x$ exhaust emission using gain independent luminosity parameters and engine parameters.

The correlation between the observed $NO_x$ emission measured from the exhaust and the predicted $NO_x$ emission based on these luminosity and engine parameters is shown in FIG. 5. The correlation coefficient is 0.98 with a standard deviation of 154 ppm. The correlation coefficient is 73 ppm when only lean air/fuel ratios are considered.

Figure 6:
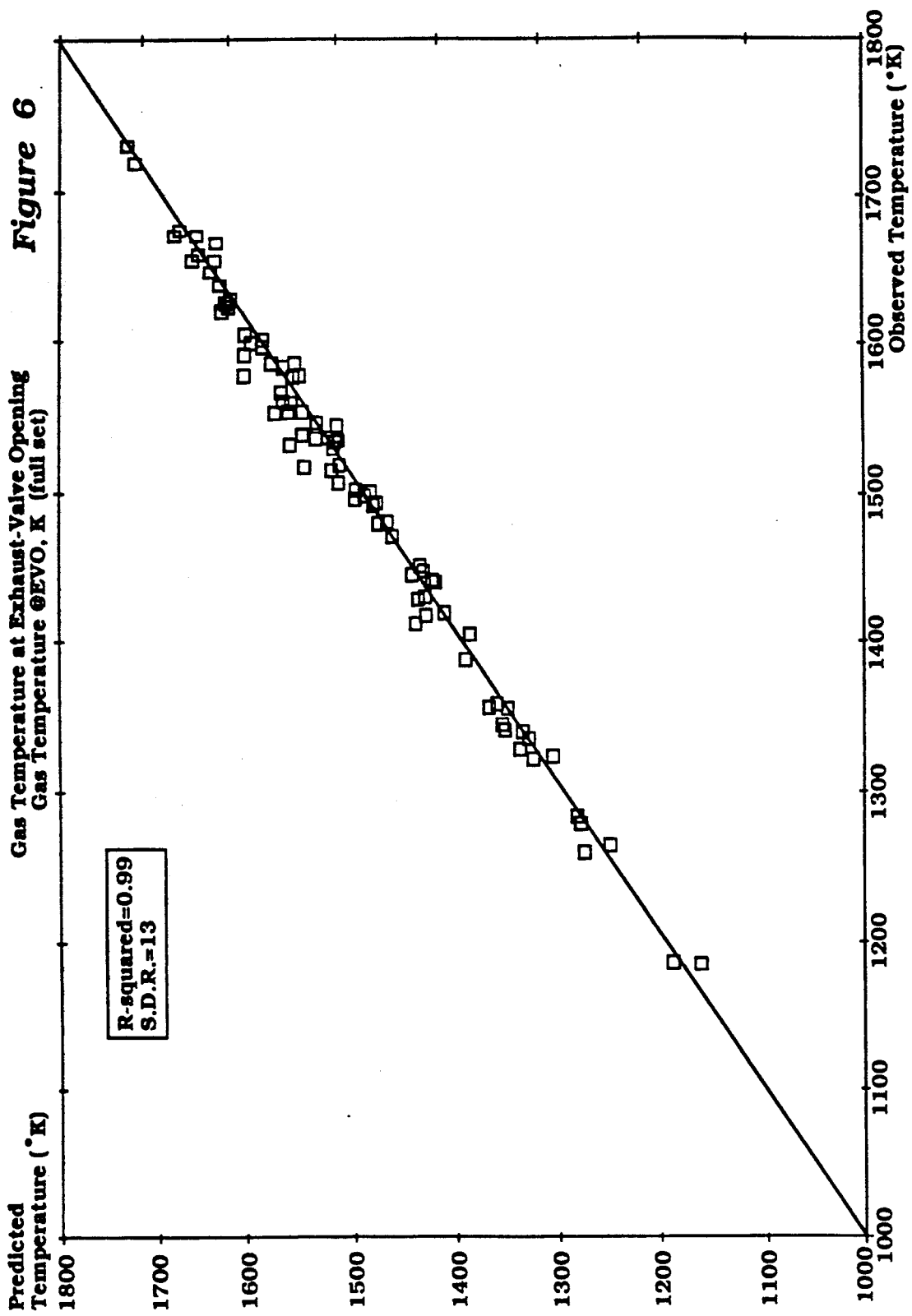
FIGS. 6 and 15 show the correlation between observed and predicted gas temperature at exhaust valve opening using gain independent luminosity parameters and engine parameters.

Another engine condition which can be predicted based on luminosity and engine parameters is gas temperature at exhaust valve opening. This predicted temperature is a function of the same engine and luminosity parameters as $NO_x$ emission. The correlation coefficient between observed temperature using a heat release model in connection with a pressure transducer and the predicted temperature is 0.99, as shown in FIG. 6, with a standard deviation of 13°K.

High exhaust gas temperature is generally associated with wide open throttle or particularly high duty cycle operation. This luminosity based measurement of gas temperature at exhaust valve opening can be incorporated into a control loop to adjust the air/fuel ratio and/or throttle position to prevent premature failure of exhaust valves, head gasket and turbocharger and to reduce engine wear and aging.

Figure 7:
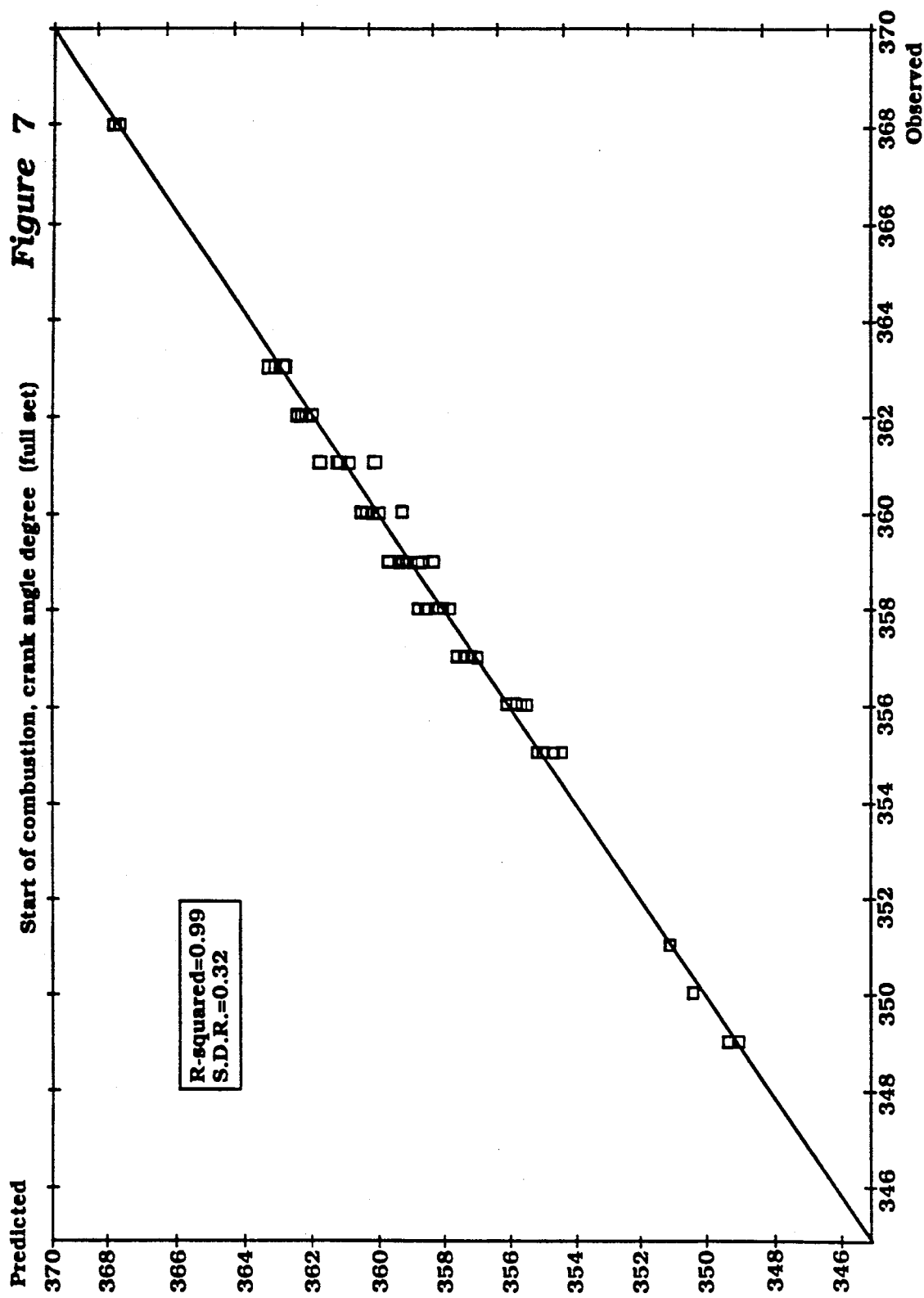
FIGS. 7 and 16 illustrate the correlation between observed and predicted start of combustion in crank angle degrees using gain independent luminosity parameters and engine parameters.

Empirical models for predicting start and end of combustion based on luminosity and engine parameters have also been developed. Start of combustion has been found to be a function of speed, $P_{int}$, $caL_{max}$, $cadL_{min}$, $(caL_{max} - ca\ 5\%L/L_{max})$, $1/(cadL_{min} - spk)$, where $caL_{max}$ - ca 5% $L/L_{max}$ is the phase difference between location of peak luminosity and the location at which the luminosity is 5% of the peak luminosity in crank angle degrees. 5% of peak luminosity is exemplary only and other percentages early in the luminosity curve can also be used, for example 1%–10%. The correlation between observed start of combustion determined by a heat release model using a pressure transducer and predicted start of combustion based on the luminosity and engine parameters is shown in FIG. 7. The correlation coefficient is 0.99 with a standard deviation of 0.32 degrees.

Figure 8:
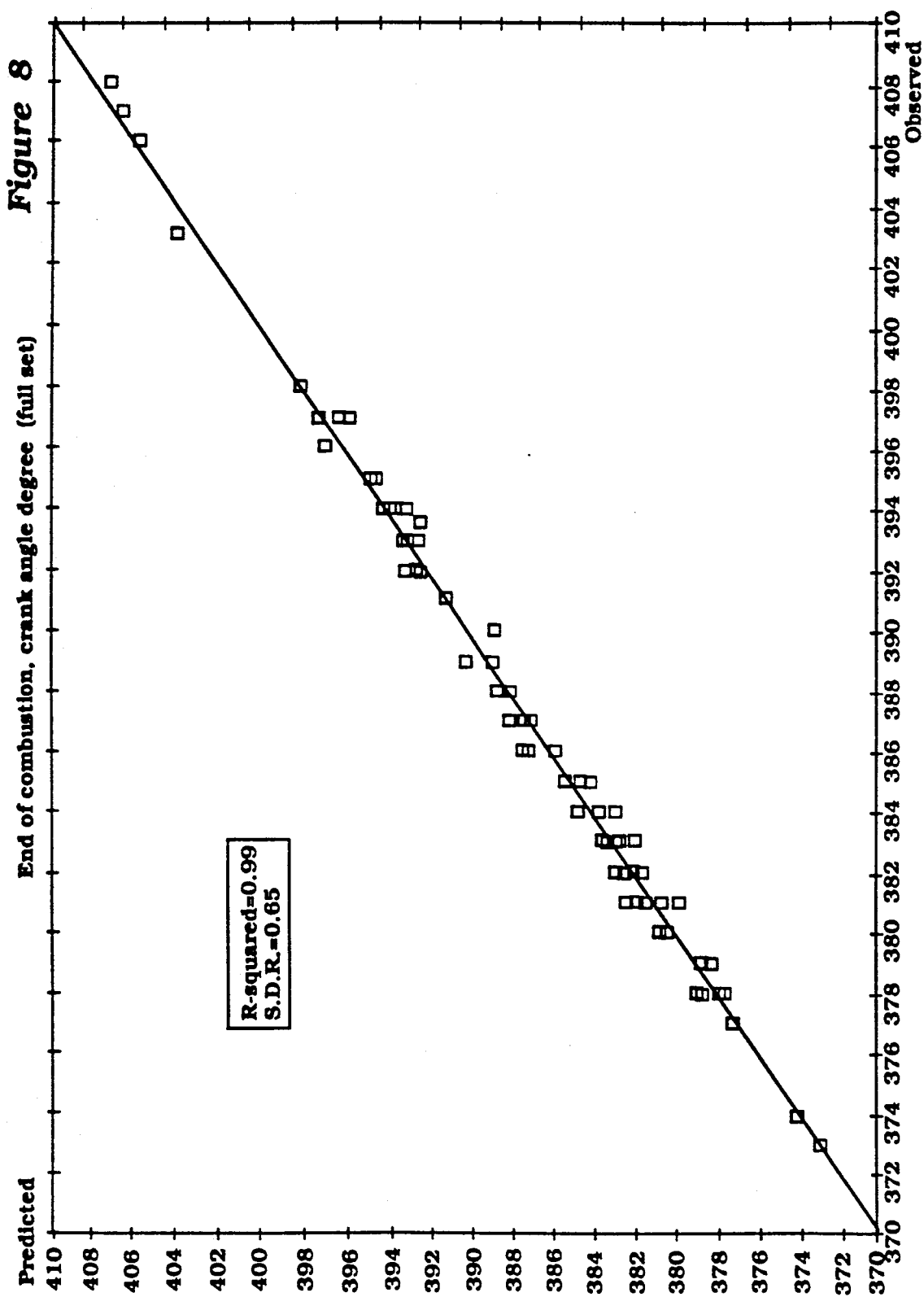
FIGS. 8 and 17 depict the correlation between observed and predicted end of combustion in crank angle degrees using gain independent luminosity parameters and engine parameters.

End of combustion can be predicted and is a function of speed, $P_{int}$, $caL_{max}$, $cadL_{max}$, $cadL_{min}$, $1/(cadL_{min} - spk)$. The relationship between the end of combustion predicted from this correlation and the observed end of combustion determined by a heat release model using a pressure transducer is shown in FIG. 8. The correlation coefficient is 0.99 with a standard deviation of 0.65 degrees.

It should be readily apparent that the use of the luminosity curve and in particular various gain independent parameters of that curve are extremely effective in measuring conditions in the combustion chamber and in determining various engine operating parameters and engine running conditions. It is to be understood that the relationships between the luminosity and engine parameters, and engine operating and running conditions such as air/fuel ratio are exemplary only. It should be noted that correlations can be obtained although not quite as good by eliminating certain parameters or terms from the equations which will effect the standard deviations. Correlations between observed and predicted values using a reduced set of terms in the quadratic model for location of peak pressure, IMEP, air/fuel ratio, $NO_x$ emission, gas temperature at exhaust valve opening and start and end of combustion are shown in FIGS. 11-17. Certain parameters and terms may also be eliminated depending on the type of engine used. On the other hand, the luminosity parameter $1/(cadL_{min}-spk)$ has been found to be very important in determining the foregoing engine parameters and running conditions. Those skilled in the art and armed with this knowledge should be able to provide various engine controls such as the timing of the spark ignition and timing and duration of fuel injection or changing of air/fuel ratios through premixing devices such as carburetors or port injectors so as to obtain optimum performance in response to the measured combustion conditions. For example, by measuring the location of peak cylinder pressure, it is possible to phase the burning by utilizing feedback control of the spark timing to improve fuel consumption and better emission control. In the same manner, the proper phasing of the burn rate using feedback control of spark timing can improve fuel consumption and provide better emission control. The control of the air/fuel ratio by feedback control of fuel flow can improve exhaust emissions and fuel consumption. The luminosity signal may also be employed to adjust spark timing or air/fuel ratio to compensate for engine aging and manufacturing differences.

The foregoing description is that of preferred embodiments of the invention and various changes and modifications may be made without departing from the spirit and scope of the invention as defined by the appended claims.

We claim:

1. A method for operating an internal combustion engine having at least one combustion chamber, means for forming a combustible air/fuel mixture within the combustion chamber, means for detecting the luminosity within the combustion chamber during each cycle of operation of the engine from prior to initiation of combustion until after completion of combustion, generating a curve based on the detected luminosity, determining at least the location of minimum luminosity derivative of the luminosity curve in relation to output shaft angle and measuring at least one parameter of the engine based on at least the determined location of minimum luminosity derivative of the luminosity curve.

2. A method for operating an internal combustion engine as recited in claim 1, wherein the location of peak pressure is measured.

3. A method for operating an internal combustion engine as recited in claim 1, wherein indicated mean effective pressure is measured.

4. A method for operating an internal combustion engine as recited in claim 1, wherein air/fuel ratio is measured.

5. A method for operating an internal combustion engine as recited in claim 1, wherein $NO_x$ emission is measured.

6. A method for operating air internal combustion engine as recited in claim 1, wherein start of combustion is measured.

7. A method for operating an internal combustion engine as recited in claim 1, wherein end of combustion is measured.

8. A method for operating an internal combustion engine as recited in claim 2, wherein location of peak luminosity and location of peak luminosity derivative of the luminosity curve are also determined and the location of peak pressure is measured based also on the determined location of peak luminosity and location of peak luminosity derivative.

9. A method for operating an internal combustion engine as recited in claim 3, wherein location of peak luminosity and location of peak luminosity derivative of the luminosity curve are also determined and the indicated mean effective pressure is measured based also on the determined location of peak luminosity and location of peak luminosity derivative.

10. A method for operating an internal combustion engine as recited in claim 4, wherein location of peak luminosity, location of peak luminosity derivative, the X-coordinate of the centroid of the luminosity signal and the normalized Y-coordinate of the centroid of the luminosity signal against peak luminosity of the luminosity curve are also determined and the air/fuel ratio is measured based also on the determined location of peak luminosity, location of peak luminosity derivative, the X-coordinate of the centroid of the luminosity signal and the normalized Y-coordinate of the centroid of the luminosity signal against peak luminosity.

11. A method for operating an internal combustion engine as recited in claim 5, wherein location of peak luminosity, the X-coordinate of the centroid of the luminosity signal, the normalized Y-coordinate of the centroid of the luminosity signal against peak luminosity, the normalized first moment of the luminosity signal against peak luminosity, the normalized second moment about the X-coordinate of the centroid of the luminosity signal against peak luminosity and the normalized third moment about the X-coordinate of the centroid of the luminosity signal against peak luminosity of the luminosity curve are also determined and the $NO_x$ emission is measured based also on the determined location of peak luminosity, the X-coordinate of the centroid of the luminosity signal, the normalized Y-coordinate of the centroid of the luminosity signal against peak luminosity, the normalized first moment of the luminosity signal against peak luminosity, the normalized second moment about the X-coordinate of the centroid of the luminosity signal against peak luminosity and the normalized third moment about the X-coordinate of the centroid of the luminosity signal against peak luminosity.

12. A method for operating an internal combustion engine as recited in claim 6, wherein location of peak luminosity and the location at which the luminosity is a particular percentage of the peak luminosity of the luminosity curve are also determined and the start of combustion is measured based also on the determined location of peak luminosity and location at which the luminosity is a particular percentage of the peak luminosity.

13. A method for operating an internal combustion engine as recited in claim 7, wherein location of peak luminosity and location of peak luminosity derivative of the luminosity curve are also determined and the end of combustion is measured based also on the determined location of peak luminosity and location of peak luminosity derivative.

14. A method for operating an internal combustion engine as recited in claim 4, further including calculating the air/fuel ratio based on signals from a zirconia sensor.

15. A method for operating an internal combustion engine as recited in claim 1, further including adjusting at least one parameter of the engine to attain a desired relationship between the determined characteristic of at least one gain independent parameter and output shaft angle.

16. A method for operating an internal combustion engine as recited in claim 2, wherein location of peak luminosity of the luminosity curve is also determined and the location of peak pressure is measured based also on the determined location of peak luminosity.

17. A method for operating an internal combustion engine as recited in claim 3, wherein location of peak luminosity of the luminosity curve is also determined and the indicated mean effective pressure is measured based also on the determined location of peak luminosity.

18. A method for operating an internal combustion engine as recited in claim 4, wherein location of peak luminosity of the luminosity curve is also determined and the air/fuel ratio is measured based also on the determined location of peak luminosity.

19. A method for operating an internal combustion engine as recited in claim 5, wherein location of peak luminosity of the luminosity curve is also determined and the $NO_x$ emission is measured based also on the determined location of peak luminosity.

20. A method for operating an internal combustion engine as recited in claim 6, wherein location of peak luminosity of the luminosity curve is also determined and the start of combustion is measured based also on the determined location of peak luminosity.

21. A method for operating an internal combustion engine as recited in claim 7, wherein location of peak luminosity of the luminosity curve is also determined and the end of combustion is measured based also on the determined location of peak luminosity.

22. A method for operating an internal combustion engine having at least one combustion chamber, means for forming a combustible air/fuel mixture within the combustion chamber, means for detecting the luminosity within the combustion chamber during each cycle of operation of the engine from prior to initiation of combustion until after completion of combustion, generating a curve based on the detected luminosity, determining a characteristic of at least one gain independent parameter of the luminosity curve in relation to output shaft angle and measuring gas temperature at exhaust valve opening based on the determined characteristic of at least one gain independent parameter.

23. A method for operating an internal combustion engine as recited in claim 22, wherein location of peak luminosity, location of minimum luminosity derivative, the X-coordinate of the centroid of the luminosity signal, the normalized Y-coordinate of the centroid of the luminosity signal against peak luminosity, the normalized first moment of the luminosity signal against peak luminosity, the normalized second moment about the X-coordinate of the centroid of the luminosity signal against peak luminosity and the normalized third moment about the X-coordinate of the centroid of the luminosity signal against peak luminosity are determined.

24. A method for operating an internal combustion engine having at least one combustion chamber, means for forming a combustible air/fuel mixture within the combustion chamber, means for detecting the luminosity within the combustion chamber, generating a curve based on the detected luminosity, determining at least the location of minimum luminosity derivative of the luminosity curve in relation to output shaft angle, measuring at least one parameter of the engine based on at least the determined location of minimum luminosity derivative of the luminosity curve and adjusting at least one parameter of the engine to attain the desired location of the determined minimum luminosity derivative of the luminosity curve to compensate for engine aging.

25. A method for operating an internal combustion engine as recited in claim 24, wherein the spark timing is adjusted.

26. A method for operating an internal combustion engine as recited in claim 24, wherein air/fuel ratio is adjusted.

27. A method for operating an internal combustion engine having at least one combustion chamber, means for forming a combustible air/fuel mixture within the combustion chamber, means for detecting the luminosity within the combustion chamber during each cycle of operation of the engine from prior to initiation of combustion until after completion of combustion, generating a curve based on the detected luminosity, determining at least a derivative on the luminosity curve in relation to output shaft angle and measuring indicated mean effective pressure based on at least the determined derivative on the luminosity curve.

* * * * *